United States Patent Office 3,062,719
Patented Nov. 6, 1962

3,062,719
TRISODIUM CALCIUM DIETHYLENETRIAMINE-
PENTAACETIC ACID, COMPOSITIONS CON-
TAINING THE SAME, AND THE USE THEREOF
Martin Rubin, Silver Spring, Md., and Martin Dexter,
White Plains, N.Y., assignors to Geigy Chemical Cor-
poration, Ardsley, N.Y., a corporation of Delaware
No Drawing. Filed Oct. 19, 1959, Ser. No. 847,049
8 Claims. (Cl. 167—68)

The instant invention relates to a medical composition essentially consisting of the trisodium salt of the calcium chelate of diethylenetriamine pentaacetic acid. The parent acid has the following structural formula:

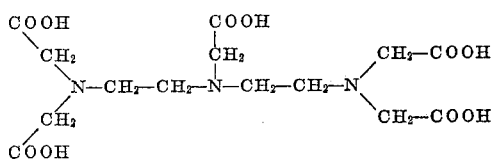

The invention also relates to a method for the treatment of hemachromatosis by parenteral administration, preferably intravenous administration, of a medical composition essentially consisting of a pyrogen-free aqueous solution of chemically pure trisodium calcium diethylene triaminepentaacetic acid.

One of the vexing problems in medicine is the alleviation or cure of heavy metal poisoning. Many chelating compounds have been suggested for these purposes. In fact one of the instant applicants is the co-inventor of Patent 2,698,823 which relates to medical preparations employing disodium calcium ethylenediaminetetraacetate. This compound which has been accepted as a treatment of choice in lead poisoning is, however, not suitable for all heavy metals. Thus the endogenous iron poisoning characteristic of the disease of hemochromatosis is not amenable to treatment with the di-sodium calcium ethylenediaminetetraacetate. In contrast, the instant compound can remove iron from the body. It passes out of the body through the urinary tract in the form of the iron chelate, a compound which is water soluble.

In use, the calcium chelate of diethylenetriaminepentaacetic acid must be absolutely chemically pure and must be used in a pyrogen free solution. Fortuitously an aqueous solution of this compound exhibits the proper pH (approximately 7.4), although adjustment may have to be made by appropriate additions of hydrochloric, acetic or citric acid on the one hand or of sodium hydroxide on the other hand, as may be required.

The pyrogen free aqueous solution may be applied medically through parenteral routes, ordinarily intravenously. Ordinarily also the pyrogen free solution would be made up with 5-10 percent glucose therein to form an isotonic solution having a pH of 7.2-7.4. The pyrogen free solution should contain about 1-10% of the subject compound therein. Since the subject compound is stable, the pyrogen free solution may be dehydrated and the composition packaged in vials for reconstitution at the site of use.

The following example further illustrates practice of the instant invention.

*Trisodium Calcium Diethylenetriaminepentaacetic Acid*

To a slurry of 393 g. of diethylenetriaminepentaacetic acid in 2 liters of water was added 100 g. of powdered pure calcium carbonate. The mixture was heated to reflux with stirring with the addition slowly of 120 g. of sodium hydroxide in 500 ml. of water. As the alkali was added, the ingredients went into solution with simultaneous evolution of carbon dioxide. At the end of the alkali addition the solution was clear and approximately neutral. Following concentration in vacuo on a steam pot to a volume of one liter, the solution was cooled and the product precipitated by the addition of three liters of alcohol to the aqueous solution. Following filtration and drying, the product provided the correct analysis for the trisodium calcium diethylenetriaminepentaacetic acid. For therapeutic use the product was dissolved in pyrogen free water to provide a solution containing one gram of the agent in 4 ml. of water.

If, in the foregoing example 56 g. of calcium oxide are used instead of 100 g. of calcium carbonate, then in a similar manner the trisodium calcium diethylenetriaminepentaacetic acid is obtained.

Iron storage disease is unusual in that it is not known to afflict animals. This factor has hindered study of the disease since tests must be carried out with utmost caution on humans only after all requisite toxicity evaluations have been completed in animals. The following description indicates the applicability of the agent for the purpose at hand. A white male patient of age 52 was known to have iron storage disease from his clinical history and by pathologic examination of tissue obtained by biopsy of the liver. The patient's condition was further complicated by coexisting heart disease which required his hospitalization. A test dosage of calcium trisodium diethylenetriaminepentaacetic acid was prepared by the addition of 10 ml. of the 25% solution described above to 100 ml. of 5% glucose. The solution was infused in the patient's vein over a two hour period. Examination of the urine showed that a total of 50 mg. of iron was excreted in the 24-hour period following the administration of the drug. Following this test dose, the drug was administered in 4 g. dosages on each of three succeeding days. The total amount of iron removed into the urine by this treatment was over 180 mg.

What is claimed is:
1. A medical composition for the elimination of iron essentially consisting of a pyrogen-free aqueous solution of chemically pure trisodium calcium diethylenetriaminepentaacetic acid.
2. The medical preparation of claim 1 in isotonic solution.
3. An isotonic pyrogen-free aqueous solution for the treatment of hemachromatosis containing from 1–10% of chemically pure trisodium calcium diethylenetriaminepentaacetic acid, from 5–10% glucose, and having a pH within the range of 7.2–7.4.
4. A method of treating hemachromatosis which comprises parenterally administering a pyrogen-free aqueous solution of chemically pure trisodium calcium diethylenetriaminepentaacetic acid.
5. A method of treating hemachromatosis which comprises parenterally administering an isotonic pyrogen-free aqueous solution containing from 1–10% of chemically pure trisodium calcium diethylenetriaminepentaacetic acid, from 5–10% glucose, and having a pH within the range of 7.2–7.4.

6. Trisodium calcium diethylenetriaminepentaacetic acid.

7. The iron chelate of trisodium calcium diethylenetriaminepentaacetic acid.

8. In the removal of iron from a hemachromatotic, the improvement which comprises administering trisodium calcium diethylenetriaminepentaacetic acid to the hemachromatotic, whereby iron passes out of the body of the hemachromatotic through the urinary tract in the form of the iron chelate of trisodium calcium diethylenetriaminepentaacetic acid.

References Cited in the file of this patent

FOREIGN PATENTS

| | | |
|---|---|---|
| 601,817 | Great Britain | May 13, 1948 |
| 715,976 | Great Britain | Sept. 22, 1954 |

OTHER REFERENCES

Chemical Abstracts, vol. 50 (1956), pp. 2906e, 3697c, 11573e.

Seven et al.: Am. J. Med. Sciences, vol. 228, pp. 646–651 (1954).

Fried et al.: PSEBM, 100:3, pp. 570–573, March 1959.